US007237610B1

(12) United States Patent
Saini et al.

(10) Patent No.: US 7,237,610 B1
(45) Date of Patent: Jul. 3, 2007

(54) DEGRADABLE PARTICULATES AS FRICTION REDUCERS FOR THE FLOW OF SOLID PARTICULATES AND ASSOCIATED METHODS OF USE

(75) Inventors: Rajes K. Saini, Duncan, OK (US); Michael J. R. Segura, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/393,607

(22) Filed: Mar. 30, 2006

(51) Int. Cl.
*E21B 43/267* (2006.01)

(52) U.S. Cl. .................. 166/280.2; 166/279; 166/308.3

(58) Field of Classification Search ................ 166/276, 166/278, 305.1, 308.3; 507/211, 219, 269, 507/924
See application file for complete search history.

(56) References Cited

U.S. PATENT DOCUMENTS

| | | | |
|---|---|---|---|
| 2,238,671 A | 4/1941 | Woodhouse .................. 166/21 |
| 2,703,316 A | 3/1955 | Palmer ....................... 260/78.3 |
| 3,173,484 A | 3/1965 | Huitt et al. .............. 166/280.1 |
| 3,195,635 A | 7/1965 | Fast .......................... 166/280.1 |
| 3,272,650 A | 9/1966 | MacVittie ........................ 134/7 |
| 3,302,719 A | 2/1967 | Fischer .................... 166/280.2 |
| 3,364,995 A | 1/1968 | Atkins et al. ............ 166/280.1 |
| 3,366,178 A | 1/1968 | Malone et al. ........... 166/280.1 |
| 3,455,390 A | 7/1969 | Gallus ......................... 166/295 |
| 3,784,585 A | 1/1974 | Schmitt et al. ............. 260/861 |
| 3,819,525 A | 6/1974 | Hattenbrun ................. 252/132 |
| 3,828,854 A | 8/1974 | Templeton et al. ......... 166/307 |
| 3,868,998 A | 3/1975 | Lybarger et al. ............ 166/278 |
| 3,912,692 A | 10/1975 | Casey et al. ............... 260/78.3 |
| 3,948,672 A | 4/1976 | Harnsberger .................. 106/90 |
| 3,955,993 A | 5/1976 | Curtice et al. ................. 106/90 |
| 3,960,736 A | 6/1976 | Free et al. ............. 252/8.55 R |
| 3,968,840 A | 7/1976 | Tate ......................... 166/280.1 |
| 3,998,272 A | 12/1976 | Maly .......................... 166/281 |
| 3,998,744 A | 12/1976 | Arnold et al. .............. 507/269 |
| 4,068,718 A | 1/1978 | Cooke, Jr. et al. ....... 166/280.2 |
| 4,169,798 A | 10/1979 | DeMartino ............. 252/8.55 R |
| 4,172,066 A | 10/1979 | Zweigle et al. ....... 260/29.6 TA |
| 4,261,421 A | 4/1981 | Watanabe .................... 166/281 |
| 4,387,769 A | 6/1983 | Erbstoesser et al. ........ 166/295 |
| 4,460,052 A | 7/1984 | Gockel .......................... 175/72 |
| 4,470,915 A | 9/1984 | Conway ................. 252/8.55 R |
| 4,498,995 A | 2/1985 | Gockel ................... 252/8.5 LC |
| 4,526,695 A | 7/1985 | Erbstoesser et al. ... 252/8.55 R |
| 4,694,905 A | 9/1987 | Armbruster ................. 166/280 |
| 4,715,967 A | 12/1987 | Bellis ....................... 252/8.551 |
| 4,716,964 A | 1/1988 | Erbstoesser et al. ........ 166/284 |
| 4,785,884 A | 11/1988 | Armbruster ................. 166/280 |
| 4,797,262 A | 1/1989 | Dewitz ....................... 422/142 |
| 4,809,783 A | 3/1989 | Hollenbeck et al. ........ 166/307 |
| 4,817,721 A | 4/1989 | Pober .......................... 166/295 |
| 4,843,118 A | 6/1989 | Lai et al. ..................... 524/555 |
| 4,848,467 A | 7/1989 | Cantu et al. ................ 166/281 |
| 4,886,354 A | 12/1989 | Welch et al. ................. 356/70 |
| 4,957,165 A | 9/1990 | Cantu et al. ................ 166/295 |
| 4,961,466 A | 10/1990 | Himes et al. ............... 166/250 |
| 4,986,353 A | 1/1991 | Clark et al. ................. 166/279 |
| 4,986,354 A | 1/1991 | Cantu et al. ................ 166/279 |
| 4,986,355 A | 1/1991 | Casad et al. ................ 166/295 |
| 5,082,056 A | 1/1992 | Tackett, Jr. ................. 166/295 |
| 5,142,023 A | 8/1992 | Gruber et al. .............. 528/354 |
| 5,216,050 A | 6/1993 | Sinclair ...................... 524/108 |
| 5,247,059 A | 9/1993 | Gruber et al. .............. 528/354 |
| 5,249,628 A | 10/1993 | Surjaatmadja .............. 166/305 |
| 5,295,542 A | 3/1994 | Cole et al. .................. 166/278 |
| 5,325,923 A | 7/1994 | Surjaatmadja et al. ...... 166/308 |
| 5,330,005 A | 7/1994 | Card et al. .................. 166/280 |
| 5,359,026 A | 10/1994 | Gruber ....................... 528/354 |
| 5,360,068 A | 11/1994 | Sprunt et al. ............... 166/259 |
| 5,363,916 A | 11/1994 | Himes et al. ............... 166/276 |

(Continued)

FOREIGN PATENT DOCUMENTS

EP   0 510 762 A2   10/1992

(Continued)

OTHER PUBLICATIONS

Simmons, et al., *Poly(phenyllactide): Synthesis, Characterization, and Hydrolytic Degradation*, Biomacromolecules, vol. 2, No. 2, 2001 (pp. 658-663).

(Continued)

*Primary Examiner*—Zakiya W. Bates
*Assistant Examiner*—Kerry W. Leonard
(74) *Attorney, Agent, or Firm*—Robert A. Kent; Baker Botts

(57) ABSTRACT

Particulate compositions that comprise macro-particulates, and degradable particulates in an amount sufficient to reduce friction between the macro-particulates, the degradable particulates having a mean particle diameter of at least about 20 times smaller than the mean particle diameter of the macro-particulates are disclosed herein. Also disclosed are fluids that comprise a liquid component, and a particulate composition, the particulate composition comprising macro-particulates and degradable particulates having a mean particle diameter of at least about 20 times smaller than the mean particle diameter of the macro-particulates, wherein the degradable particulates are present in the particulate composition in an amount sufficient to reduce friction between the macro-particulates. Methods of using the particulate compositions and fluids are also disclosed.

26 Claims, No Drawings

U.S. PATENT DOCUMENTS

| | | | |
|---|---|---|---|
| 5,373,901 A | 12/1994 | Norman et al. | 166/300 |
| 5,386,874 A | 2/1995 | Laramay et al. | 166/300 |
| 5,396,957 A | 3/1995 | Surjaatmadja et al. | 166/308 |
| 5,402,846 A | 4/1995 | Jennings, Jr. et al. | 166/259 |
| 5,439,055 A | 8/1995 | Card et al. | 166/280 |
| 5,460,226 A | 10/1995 | Lawton et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/354 |
| 5,497,830 A | 3/1996 | Boles et al. | 166/300 |
| 5,499,678 A | 3/1996 | Surjaatmadja et al. | 166/298 |
| 5,505,787 A | 4/1996 | Yamaguchi | 134/4 |
| 5,512,071 A | 4/1996 | Yam et al. | 51/307 |
| 5,536,807 A | 7/1996 | Gruber et al. | 528/354 |
| 5,591,700 A | 1/1997 | Harris et al. | 507/204 |
| 5,594,095 A | 1/1997 | Gruber et al. | 528/354 |
| 5,604,186 A | 2/1997 | Hunt et al. | 507/204 |
| 5,607,905 A | 3/1997 | Dobson, Jr. et al. | 507/211 |
| 5,670,473 A | 9/1997 | Scepanski | 510/445 |
| 5,698,322 A | 12/1997 | Tsai et al. | 428/373 |
| 5,765,642 A | 6/1998 | Surjaatmadja | 166/297 |
| 5,791,415 A | 8/1998 | Nguyen et al. | 166/280 |
| 5,833,000 A | 11/1998 | Weaver et al. | 166/276 |
| 5,849,401 A | 12/1998 | El-Afandi et al. | 428/215 |
| 5,853,048 A | 12/1998 | Weaver et al. | 166/279 |
| 5,893,416 A | 4/1999 | Read | 166/304 |
| 5,908,073 A | 6/1999 | Nguyen et al. | 166/276 |
| 5,924,488 A | 7/1999 | Nguyen et al. | 166/280 |
| 5,964,291 A | 10/1999 | Bourne et al. | 166/279 |
| 6,004,400 A | 12/1999 | Bishop et al. | 134/2 |
| 6,024,170 A | 2/2000 | McCabe et al. | 166/300 |
| 6,028,113 A | 2/2000 | Scepanski | 514/643 |
| 6,047,772 A | 4/2000 | Weaver et al. | 166/276 |
| 6,114,410 A | 9/2000 | Betzold | 523/130 |
| 6,123,965 A | 9/2000 | Jacob et al. | 424/489 |
| 6,131,661 A | 10/2000 | Conner et al. | 166/300 |
| 6,135,987 A | 10/2000 | Tsai et al. | 604/365 |
| 6,143,698 A | 11/2000 | Murphey et al. | 507/145 |
| 6,162,766 A | 12/2000 | Muir et al. | 507/267 |
| 6,169,058 B1 | 1/2001 | Le et al. | 507/222 |
| 6,172,011 B1 | 1/2001 | Card et al. | 507/204 |
| 6,189,615 B1 | 2/2001 | Sydansk | 166/270 |
| 6,202,751 B1 | 3/2001 | Chatterji et al. | 166/276 |
| 6,209,643 B1 | 4/2001 | Nguyen et al. | 166/276 |
| 6,209,646 B1 | 4/2001 | Reddy et al. | 166/300 |
| 6,214,773 B1 | 4/2001 | Harris et al. | 507/271 |
| 6,242,390 B1 | 6/2001 | Mitchell et al. | 507/211 |
| 6,260,622 B1 | 7/2001 | Blok et al. | 166/305.1 |
| 6,311,773 B1 | 11/2001 | Todd et al. | 166/280 |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280 |
| 6,357,527 B1 | 3/2002 | Norman et al. | 166/300 |
| 6,364,945 B1 | 4/2002 | Chatterji et al. | 106/677 |
| 6,380,138 B1 | 4/2002 | Ischy et al. | 507/204 |
| 6,387,986 B1 | 5/2002 | Moradi-Araghi et al. | 523/211 |
| 6,390,195 B1 | 5/2002 | Nguyen et al. | 166/276 |
| 6,394,185 B1 | 5/2002 | Constien | 166/296 |
| 6,422,314 B1 | 7/2002 | Todd et al. | 166/312 |
| 6,454,003 B1 | 9/2002 | Chang et al. | 166/270 |
| 6,485,947 B1 | 11/2002 | Rajgarhia et al. | 435/139 |
| 6,488,763 B2 | 12/2002 | Brothers et al. | 106/692 |
| 6,494,263 B2 | 12/2002 | Todd | 166/312 |
| 6,508,305 B1 | 1/2003 | Brannon et al. | 166/293 |
| 6,527,051 B1 | 3/2003 | Reddy et al. | 166/300 |
| 6,554,071 B1 | 4/2003 | Reddy et al. | 166/293 |
| 6,569,814 B1 | 5/2003 | Brady et al. | 507/201 |
| 6,599,863 B1 | 7/2003 | Palmer et al. | 507/219 |
| 6,667,279 B1 | 12/2003 | Hessert et al. | 507/225 |
| 6,669,771 B2 | 12/2003 | Tokiwa et al. | 106/162.7 |
| 6,681,856 B1 | 1/2004 | Chatterji et al. | 166/294 |
| 6,686,328 B1 | 2/2004 | Binder | 510/446 |
| 6,702,023 B1 | 3/2004 | Harris et al. | 166/307 |
| 6,710,019 B1 | 3/2004 | Sawdon et al. | 507/136 |
| 6,761,218 B2 | 7/2004 | Nguyen et al. | 166/278 |
| 6,763,888 B1 | 7/2004 | Harris et al. | 166/305.1 |
| 6,817,414 B2 | 11/2004 | Lee | 166/278 |
| 6,874,353 B2 | 4/2005 | Johnson et al. | 73/54.28 |
| 6,896,058 B2 | 5/2005 | Munoz, Jr. et al. | 166/279 |
| 6,949,491 B2 | 9/2005 | Cooke, Jr. | 507/219 |
| 7,044,220 B2 * | 5/2006 | Nguyen et al. | 166/280.2 |
| 7,096,947 B2 * | 8/2006 | Todd et al. | 166/283 |
| 7,172,022 B2 * | 2/2007 | Reddy et al. | 166/293 |
| 2001/0016562 A1 | 8/2001 | Muir et al. | 507/201 |
| 2002/0036088 A1 | 3/2002 | Todd | 166/300 |
| 2002/0125012 A1 | 9/2002 | Dawson et al. | 166/300 |
| 2003/0060374 A1 | 3/2003 | Cooke, Jr. | 507/200 |
| 2003/0114314 A1 | 6/2003 | Ballard et al. | 507/100 |
| 2003/0130133 A1 | 7/2003 | Vollmer | 507/100 |
| 2003/0188766 A1 | 10/2003 | Banerjee et al. | 134/7 |
| 2003/0234103 A1 | 12/2003 | Lee et al. | 166/293 |
| 2004/0014607 A1 | 1/2004 | Sinclair et al. | 507/200 |
| 2004/0040706 A1 | 3/2004 | Hossaini et al. | 166/278 |
| 2004/0055747 A1 | 3/2004 | Lee | 166/278 |
| 2004/0094300 A1 | 5/2004 | Sullivan et al. | 166/308.1 |
| 2004/0106525 A1 | 6/2004 | Willbert et al. | 507/200 |
| 2004/0138068 A1 | 7/2004 | Rimmer et al. | 507/100 |
| 2004/0152601 A1 | 8/2004 | Still et al. | 507/100 |
| 2004/0152602 A1 | 8/2004 | Boles | 507/100 |
| 2004/0216876 A1 | 11/2004 | Lee | 166/280.1 |
| 2004/0231845 A1 | 11/2004 | Cooke, Jr. | 166/279 |
| 2004/0261993 A1 | 12/2004 | Nguyen | 166/276 |
| 2004/0261995 A1 | 12/2004 | Nguyen et al. | 166/279 |
| 2004/0261996 A1 | 12/2004 | Munoz, Jr., et al. | 166/279 |
| 2004/0261999 A1 | 12/2004 | Nguyen | 166/292 |
| 2005/0006095 A1 | 1/2005 | Justus et al. | 166/295 |
| 2005/0028976 A1 | 2/2005 | Nguyen | 166/276 |
| 2005/0034861 A1 | 2/2005 | Saini et al. | 166/278 |
| 2005/0034865 A1 | 2/2005 | Todd et al. | 166/304 |
| 2005/0034868 A1 | 2/2005 | Frost et al. | 166/307 |
| 2005/0045328 A1 | 3/2005 | Frost et al. | 166/278 |
| 2005/0051330 A1 | 3/2005 | Nguyen | 166/276 |
| 2005/0056423 A1 | 3/2005 | Todd, et al. | 166/278 |
| 2005/0059556 A1 | 3/2005 | Munoz, Jr., et al. | 507/103 |
| 2005/0059557 A1 | 3/2005 | Todd et al. | 507/110 |
| 2005/0059558 A1 | 3/2005 | Blauch et al. | 507/203 |
| 2005/0103496 A1 | 5/2005 | Todd et al. | 166/278 |
| 2005/0126780 A1 | 6/2005 | Todd et al. | 166/280 |
| 2005/0126785 A1 | 6/2005 | Todd | 166/307 |
| 2005/0130848 A1 | 6/2005 | Todd et al. | 166/276 |
| 2005/0161220 A1 | 7/2005 | Todd et al. | 166/283 |
| 2005/0167104 A1 | 8/2005 | Roddy et al. | 166/279 |
| 2005/0167105 A1 | 8/2005 | Roddy et al. | 166/293 |
| 2005/0167107 A1 | 8/2005 | Roddy et al. | 166/277 |
| 2005/0183741 A1 | 8/2005 | Surjaatmadja et al. | 134/6 |
| 2005/0205258 A1 | 9/2005 | Reddy et al. | 166/292 |
| 2005/0205265 A1 | 9/2005 | Todd et al. | 166/376 |
| 2005/0205266 A1 | 9/2005 | Todd et al. | 166/376 |
| 2005/0252659 A1 | 11/2005 | Sullivan et al. | 166/280.1 |
| 2005/0272613 A1 | 12/2005 | Cooke, Jr. | 507/219 |
| 2006/0042836 A1 | 3/2006 | Robb et al. | 175/65 |

FOREIGN PATENT DOCUMENTS

| | | |
|---|---|---|
| EP | 0 879 935 A2 | 11/1998 |
| EP | 0 879 935 A3 | 2/1999 |
| EP | 1 413 710 A1 | 4/2004 |
| WO | WO 93/15127 A1 | 8/1993 |
| WO | WO 94/07949 A1 | 4/1994 |
| WO | WO 94/08078 A1 | 4/1994 |
| WO | WO 94/08090 A1 | 4/1994 |
| WO | WO 95/09879 A1 | 4/1995 |
| WO | WO 97/11845 A1 | 4/1997 |
| WO | WO 99/27229 | 6/1999 |

| WO | WO 00/57022 | 9/2000 |
| WO | WO 01/02698 | 1/2001 |
| WO | WO 01/87797 A1 | 11/2001 |
| WO | WO 02/12674 A1 | 2/2002 |
| WO | WO 03/027431 A2 | 4/2003 |
| WO | WO 03/027431 A3 | 4/2003 |
| WO | WO 04/007905 | 1/2004 |
| WO | WO 04/037946 A1 | 5/2004 |
| WO | WO 04/038176 A1 | 5/2004 |

OTHER PUBLICATIONS

Yin, et al., *Preparation and Characterization of Substituted Polylactides*, American Chemical Society, vol. 32, No. 23, 1999 (pp. 7711-7718).

Yin, et al., *Synthesis and Properties of Polymers Derived form Substituted Lactic Acids*, American Chemical Society, Ch. 12, 2001 (pp. 147-159).

Cantu, et al, *Laboratory and Field Evaluation of a Combined Fluid-Loss-Control Additive and Gel Breaker for Fracturing Fluids*, SPE 18211, Society of Petroleum Engineers, 1990.

Love, et al, *Selectively Placing Many Fractures in Openhole Horizontal Wells Improves Production*, SPE 50422, Society of Petroleum Engineers, 1998.

McDaniel, et al, *Evolving New Stimulation Process Proves Highly Effective in Level 1 Dual-Lateral Completion*, SPE 78697, Society of Petroleum Engineers, 2002.

Albertsson, et al, *Aliphatic Polyesters: Systhesis, Properties and Applications*, Advances in Polymer Science, vol. 157, Degradable Aliphatic Polyesters, 2002.

Dechy-Cabaret, et al, *Controlled Ring-Opening Polymerization of Lactide and Glycolide*, American Chemical Society, Chemical Reviews, A-Z, AA-AD, received 2004.

Funkhouser, et al, *Synthetic Polymer Fracturing Fluid for High-Temperature Applications*, SPE 80236, Society of Petroleum Engineers, 2003.

*Chelating Agents*, Encyclopedia of Chemical Technology, vol. 5 (764-795).

Vichaibun, et al, *A New Assay for the Enzymatic Degradation of Polylactic Acid, Short Report*, ScienceAsia, vol. 29, 2003 (pp. 297-300).

Halliburton, *SurgiFrac$^{SM}$ Service, A Quick and Cost-Effective Method to Help Boost Production From Openhole Horizontal Completions, Halliburton Communications*, HO3297, 2002.

Halliburton, *Cobra Frac$^{SM}$ Service, Coiled Tubing Fracturing—Cost-Effective Method for Stimulating Untapped Reserves*, HO2319R, Halliburton Energy Services, 2000.

Halliburton, *CobraJet Frac$^{SM}$ Service, Cost-Effective Technology That Can Help Reduce Cost Per BOE Produced, Shorten Cycle Time and Reduce Capex*, Halliburton Communications.

Y. Chiang et al., *Hydrolysis Of Ortho Esters; Further Investigation Of The Factors Which Control The Rate-Determining Step*, Engineering Information, Inc. NY, NY, vol. 105, No. 23 (XP-002322842), Nov. 16, 1983.

M. Ahmad, et al., *Ortho Ester Hydrolysis: Direct Evidence For A Three-Stage Reaction Mechanism*, Engineering Information, Inc. NY, NY, vol. 101, No. 10 (XP-002322843), May 9, 1979.

Skrabal et al, *The Hydrolysis Rate of Orthoformic Acid Ethyl Ether*, Chemical Institute of the University of Graz, Jan. 13, 1921, pp. 1-38, Jan. 13, 1921.

Heller, et al., *Poly(ortho esters)—From Concept To Reality*, Biomacromolecules, vol. 5, No. 5, 2004 (pp. 1625-1632), May 9, 1979.

Schwach-Abdellaoui, et al., *Hydrolysis and Erosion Studies of Autocatalyzed Poly(ortho esters) Containing Lactoyl-Lactyl Acid Dimers*, American Chemical Society, vol. 32, No. 2, 1999 (pp. 301-307).

Ng, et al., *Synthesis and Erosion Studies of Self-Catalyzed Poly(ortho ester)s*, American Chemical Society, vol. 30, No. 4, 1997 (pp. 770-772).

Ng, et al., *Development of a Poly(ortho ester) prototype With A Latent Acid In The Polymer Backbone For 5-fluorouracil Delivery*, Journal of Controlled Release 65 (2000), (pp. 367-374).

Rothen-Weinhold, et al., *Release of BSA from poly(ortho ester) extruded thin strands*, Journal of Controlled Release 71, 2001, (pp. 31-37).

Heller, et al., *Poly(ortho ester)s—their development and some recent applications*, European Journal of Pharmaceutics and Biopharmaceutics, 50, 2000, (pp. 121-128).

Heller, et al., *Poly(ortho esters); synthesis, characterization, properties and uses*, Advanced Drug Delivery Reviews, 54, 2002, (pp. 1015-1039).

Heller, et al., *Poly(ortho esters) For The Pulsed And Continuous Delivery of Peptides And Proteins*, Controlled Release and Biomedical Polymers Department, SRI International, (pp. 39-46).

Zignani, et al., *Subconjunctival biocompatibility of a viscous bioerodable poly(ortho ester)*, J. Biomed Mater Res, 39, 1998, pp. 277-285.

Toncheva, et al., *Use of Block Copolymers of Poly(Ortho Esters) and Poly (Ethylene Glycol)*, Journal of Drug Targeting, 2003, vol. 11(6), pp. 345-353.

Schwach-Abdellaoui, et al., *Control of Molecular Weight For Auto-Catalyzed Poly(ortho ester) Obtained by Polycondensation Reaction*, International Journal of Polymer Anal. Charact., 7: 145-161, 2002, pp. 145-161.

Heller, et al., *Release of Norethindrone from Poly(Ortho Esters)*, Polymer Engineering and Science, Mid-Aug. 1981, vol. 21, No. 11 (pp. 727-731).

Cordes, et al., *Mechanism and Catalysis for Hydrolysis of Acetals, Ketals, and Other Esters*, Department of Chemistry, Indiana University, Bloomington, Indiana, Chemical Reviews, 1974, vol. 74, No. 5, pp. 581-603.

Todd, et al., *A Chemical "Trigger" Useful For Oilfield Applications*, Society Of Petroleum Engineers, Inc., SPE 92709, Feb. 4, 2005.

* cited by examiner

DEGRADABLE PARTICULATES AS FRICTION REDUCERS FOR THE FLOW OF SOLID PARTICULATES AND ASSOCIATED METHODS OF USE

CROSS-REFERENCE TO RELATED APPLICATIONS

The present invention is related to U.S. patent application Ser. No. 11/393,597, entitled "Degradable Particulates as Friction Reducers for the Flow of Solid Particulates and Associated Methods," filed on even date herewith, the entire disclosure of which is incorporated herein by reference.

BACKGROUND

The present invention relates to methods and compositions for improving particulate flow. More particularly, the present invention relates to the use of degradable particulates as friction reducers that may reduce the potential stresses caused by increased particulate loading in fluids.

Fluids comprising solid particulates often are used in a variety of applications performed in subterranean formations. Such applications include, but are not limited to, drilling operations, production stimulation operations (e.g., hydraulic fracturing) and well completion operations (e.g., gravel packing). Fluids containing solid particulates are also used in a variety of surface applications as well.

The term "particulate(s)," as used herein, refers to particles having a defined physical shape as well as those with irregular geometries, including any particles having the physical shape of platelets, shavings, fibers, flakes, ribbons, rods, strips, spheres, spheroids, toroids, pellets, tablets, or any other physical shape.

In a hydraulic-fracturing operation, a type of fluid, commonly referred to as a "fracturing fluid", may be placed in a subterranean formation at or above a pressure sufficient to create or enhance at least one fracture in the formation. Enhancing a fracture includes enlarging a pre-existing fracture in the formation. In some instances, a hydraulic-fracturing operation may involve pumping a proppant-free, viscous fluid (commonly referred to as a "pad fluid") into a subterranean formation faster than the fluid can escape into the formation so that the pressure in the formation rises and the formation breaks, creating or enhancing one fractures in the subterranean formation. At a desired time, for example, once the fracture is formed or enlarged, particulates (commonly referred to as "proppant") are generally placed into the fracture to form a proppant pack that may prevent the fracture from closing when the hydraulic pressure is released and thereby potentially enhance the conductivity of the formation.

In a gravel-packing operation, particulates (commonly referred to as "gravel") may be carried to a portion of a well bore penetrating a subterranean formation by a carrier fluid, inter alia, to reduce the migration of unconsolidated formation particulates (e.g. formation sand) into the well bore. The carrier fluid may be viscosified, inter alia, to enhance certain properties (e.g., particulate suspension). Once the gravel has been placed into a gravel pack in the well bore or in a portion of the subterranean formation, the viscosity of the carrier fluid may be reduced, whereupon it may be returned to the surface and recovered. As used herein, the term "gravel pack" refers to the placement of particulates in and/or neighboring a portion of a subterranean formation so as to provide at least some degree of sand control, such as by packing the annulus between the subterranean formation and a screen disposed in the subterranean formation with particulates of a specific size designed to prevent the passage of formation sand. Gravel packs often are used to stabilize the formation while causing minimal impairment to well productivity. While screenless gravel-packing operations are becoming increasingly common, traditional gravel-packing operations commonly involve placing a gravel-pack screen in the well bore neighboring a desired portion of the subterranean formation, and packing the surrounding annulus between the screen and the well bore with gravel particulates that are sized to prevent and inhibit the passage of formation solids through the gravel pack with produced fluids. The gravel-pack screen is generally a filter assembly used to support and retain the gravel particulates placed during the gravel-packing operation. A wide range of sizes and screen configurations are available to suit the characteristics of the well bore, the production fluid, and the portion of the subterranean formation.

In some situations, hydraulic-fracturing operations and gravel-packing operations may be combined into a single operation to stimulate production and to reduce the production of unconsolidated formation particulates. Such treatments are often referred to as "frac-pack" operations. In some cases, these treatments are completed with a gravel-pack screen assembly in place with the fracturing fluid being pumped through the annular space between the casing and screen. In such a situation, the fracturing operation may end in a screen-out condition creating an annular gravel pack between the screen and casing.

In these and other operations involving a particulate-laden fluid, an upper limit may exist as to the optimum amount of particulates that can be suspended and successfully carried in the fluid. The flow of dispersions of particulates in a liquid may become increasingly difficult as the volume fraction of particulates increases, e.g., both the steady shear viscosity and the residual stress within the dispersion may increase as the volume fraction of particles increases. The increase in steady shear viscosity and/or residual stress generally is not linear; rather, it generally increases as the solids content approaches maximum packing (for fluids having a particle size distribution that is monodisperse, maximum packing of solids is known to be about 66% by volume of the dispersion). During the flow of concentrated dispersions of solids through a container or channel (e.g., a laboratory test tube or a subterranean fracture), the solid particles may form bridges across the inner diameter of the container or channel, thereby blocking or impairing the flow. This tendency to form bridges may increase as residual stress within the dispersion increases.

When this phenomenon occurs during a conventional subterranean application, e.g., a fracturing operation, this undesirable bridging of proppant particulates across the width of a fracture in a formation may tend to prematurely halt the deposit of the proppant particulates within the fracture. This bridging may block further flow of fracturing fluid into the fracture (thereby preventing continued propagation of the fracture). In other cases, the fracturing fluid may succeed in flowing around the blockage, and may continue (without the proppant particulates) to penetrate into the formation, thereby continuing to propagate the fracture for a time. In this latter case, however, the portion of the fracture that extends beyond the bridged proppant particulates generally will lack proppant particulates, and likely will undesirably re-close shortly after the termination of the fracturing operation, because it may lack the support necessary to maintain its integrity.

The addition of small silica particles (e.g., from nanometer to micron size) to particulate-laden fluids has been used to help alleviate stresses caused by increased particulate loading. For instance, the addition of small silica particles may allow increased particulate loading in a fluid, for example, up to or greater than about 55% solids by volume. While these small silica particles generally allow increased particulate loading, their use may have some drawbacks. For instance, after introduction into a well bore, these small silica particles may lodge themselves in formation pores, preslotted liners, screens, proppant packs, and/or gravel packs, preventing or reducing fluid flow there through. This may result in an undesirable reduction in well productivity, particularly in low permeability formations.

SUMMARY

The present invention relates to methods and compositions for improving particulate flow. More particularly, the present invention relates to the use of degradable particulates as friction reducers that may reduce the potential stresses caused by increased particulate loading in fluids.

In one embodiment, the present invention provides a method of enhancing the flow of particulates that comprises providing macro-particulates, providing degradable particulates having a mean particulate diameter of at least about 20 times smaller than the man particle diameter of the macro-particulates, preparing a fluid comprising a liquid component and a particulate composition, wherein the particulate composition comprising the macro-particulates and the degradable particulates in an amount sufficient to reduce friction between the macro-particulates; and flowing the fluid from a first location to a second location.

Another embodiment of the present invention provides a method of treating a subterranean formation that comprises providing a fluid comprising a liquid component and a particulate composition, wherein the particulate composition comprises macro-particulates and degradable particulates in an amount sufficient to reduce friction between the macro-particulates having a mean particle diameter of at least about 20 times smaller than the mean particle diameter of the macro-particulates, wherein the degradable particulates are present in the particulate composition in an amount sufficient to reduce friction between the macro-particulates, and introducing the fluid into a subterranean formation.

Another embodiment of the present invention provides a method of fracturing a subterranean formation that comprises introducing a fluid into subterranean formation at or above a rate sufficient to create or enhance one or more fractures in the subterranean formation, and depositing a particulate composition into the one or more fractures so that the particulate composition props the one or more fractures, thereby preventing the one or more fractures from fully closing, wherein the particulate composition comprises macro-particulates and degradable particulates having a mean particle diameter of at least about 20 times smaller than the mean particle diameter of the macro-particulates, wherein the degradable particulates are present in the particulate composition in an amount sufficient to reduce friction between the macro-particulates.

Another embodiment of the present invention provides a method of enhancing the flow of drill cuttings that comprises providing a drilling fluid, drilling at least a portion of a well bore using at least the drilling fluid, wherein the drilling produces drill cuttings in the drilling fluid, and adding degradable particulates to the drilling fluid in an amount sufficient to reduce friction between the drill cuttings, wherein the degradable particulates have a mean particle diameter of at least about 20 times smaller than the mean particle diameter of the drill cuttings.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to methods and compositions for improving particulate flow. More particularly, the present invention relates to the use of degradable particulates as friction reducers that may reduce the potential stresses caused by increased particulate loading in fluids. While the compositions and methods of the present invention are useful in a variety of subterranean applications, they may be particularly useful in subterranean treatment operations (including gravel packing, fracturing, and frac-packing operations) that utilize fluids containing particulates (e.g., proppant, gravel, etc.).

The fluids of the present invention generally comprise a liquid component and a particulate composition, wherein the particulate composition comprises macro-particulates and degradable particulates having a mean particle diameter of at least about 20 times smaller than the mean particle diameter of the macro-particulates. The degradable particulates should be present in the particulate composition an amount sufficient to reduce friction between the macro-particulates. For example, the degradable particulates may enhance the flow of the fluid due to this reduction in friction the macro-particulate and a resultant reduction in viscosity and residual stress of this particulate-laden fluid. In some embodiments, the degradable particulates may have a mean particle diameter in the range of from about 10 nanometers to about 30 microns.

Where the methods and compositions of the present invention are used in subterranean applications, the liquid component may be any liquid component suitable for transporting solids that is commonly included in subterranean applications, including, but not limited to, water, brines, surfactant containing fluids, such as slick water, viscosified fluids, foams, aqueous gels, viscoelastic surfactant gels, emulsions, combinations thereof, and other fluids suitable for transporting solids. Where the liquid component comprises an aqueous gel, the aqueous gel generally comprises water and a gelling agent. In one embodiment, the aqueous gel further may comprise water, a gelling agent, and, optionally, a crosslinking agent that crosslinks at least a portion of the molecules of the gelling agent further increasing the viscosity of the fluid, which further may affect the fluid's ability to suspend solids. Where the liquid component comprises an emulsion, the emulsion may comprise two or more immiscible liquids; for example, the emulsion may comprise an aqueous gel and a liquefied, normally gaseous fluid (e.g., carbon dioxide). In certain embodiments, it may be desirable to increase the viscosity of a fluid so as, inter alia, to reduce fluid loss into the subterranean formation and reduce the sedimentation of suspended particles. Generally, the liquid component may be present in the fluids of the present invention in an amount in the range of from about 32% to about 99% by volume of the fluid, when measured at the surface, prior to placement of the fluid in a subterranean formation. In some embodiments, the liquid component may be present in an amount in the range of from about 45% to about 97% volume of the fluid.

The particulate composition present in the fluids of the present invention generally comprises macro-particulates and degradable particulates, wherein the degradable particulates have a mean particle diameter of at least about 20 times smaller than the mean particle diameter of the macro-particulates. In some embodiments, the degradable particulates may have a mean particle diameter in the range of from about 10 nanometers to about 30 microns. Generally, the particulate composition may be present in the fluids of the present invention in an amount in the range of from about 1% to about 68% by volume of the fluid, when measured at the surface, prior to placement of the fluid in a subterranean formation. In some embodiments, the particulate composition may be present in an amount in the range of from about 3% to about 55% by volume of the fluid. In some embodiments, the particulate composition may be preset in an amount in the range of from about 50% to about 68% by volume of the fluid. The amount of the particulate composition to include in the fluids of the present invention vary dependent on a variety of factors, including the particular application, such as moving solid particulate slurries in surface applications or in a fluid for use downhole.

Any particulate material suitable for use in subterranean applications (for example, as proppant particulates, gravel particulates, etc.) may be suitable for use as the macro-particulates. Suitable particulate materials include, but are not limited to, sand; bauxite; ceramic materials; glass materials; polymer materials; thermoplastic fluoropolymers (e.g., Teflon® (tetrafluoroethylene) materials); nut shell pieces; seed shell pieces; fruit pit pieces; wood; composite particulates; cured resinous particulates comprising nut shell pieces, seed shell pieces, inorganic fillers, and/or fruit pit pieces; and combinations thereof Though a "mean particle diameter" may be determined for the particulates of any bulk solid, the individual particulates of the bulk solid generally exist in a range of sizes, including a portion of "fines" that may have a diameter about 20 times smaller than the "mean particle diameter" of the bulk solid. Though such fines of the macro-particulates may be present in the particulate composition of the fluids of the present invention, the concentration of fines having the desired size (e.g., at least about 20 times smaller than the average diameter) generally will be sufficiently small that the fines will not impact the physical properties of the fluids of the present invention. Generally, the macro-particulates may have a mean particular diameter suitable for a particular application. In some embodiments, the macro-particulates may have mean particle diameter in the range of from about 6 mesh to about 400 mesh, U.S. Sieve Series. In particular embodiments, suitable macro-particulates may have mean particle diameters of 6/12 mesh, 8/16, 12/20, 16/30, 20/40, 30/50, 40/60, 40/70, or 50/70 mesh. Generally, the macro-particulate should have a mean particle diameter at least about 20 times as large as that of the degradable particulates. Those of ordinary skill in the art will appreciate that the macro-particulates may be monodisperse or polydisperse.

The macro-particulates may be present in the particulate composition in an amount desired for a particular application. In some embodiments, the macro-particulates may be present in the particulate composition in an amount in the range of from about 80% to about 99.75% by volume of the particulate composition. In some embodiments, the macro-particulates may be present in the particulate composition in an amount in the range of from about 90% to about 98% by volume of the particulate composition. In some embodiments, the macro-particulates may be present in the particulate composition in an amount in the range of from about 95% to about 97% by volume of the particulate composition.

The degradable particulates included in the particulate composition of the fluids of the present invention should be capable of undergoing an irreversible degradation downhole. Because these degradable particulates should undergo an irreversible degradation downhole, they generally should not undesirably plug fluid flow pathways in the formation.

As used in this disclosure, the term "irreversible" means that the degradable particulates once degraded should not recrystallize or reconsolidate downhole. As used herein, the term "degradation," or "degradable," refers to the conversion of materials into smaller components, intermediates, or end products by the result of solubilization, hydrolytic degradation, biologically formed entities (e.g., bacteria or enzymes), chemical reactions, thermal reactions, reactions induced by radiation, or any other suitable mechanism. As used herein, "hydrolytic degradation" refers to both heterogeneous (or bulk erosion) and homogenous (or surface erosion), and any stage of degradation between these two by the action of water on the particulate.

The degradable particulates included in the particulate composition of the fluids of the present invention may comprise any degradable materials suitable for use in the desired application. Degradable materials that may be used in conjunction with the present invention include, but are not limited to, degradable polymers, dehydrated compounds, oil-soluble materials, water-soluble compounds, and mixtures thereof. The term "polymer(s)", as used herein, does not imply any particular degree of polymerization; for instance, oligomers are encompassed within this definition. In some instances, the degradable material may be capable of releasing a desirable degradation product, e.g., an acid or a base, during its degradation. Among other things, the degradable materials capable of releasing an acid should degrade after a desired time to release an acid, for example, to degrade a filter cake or to reduce the viscosity of a fluid.

In certain embodiments, the degradable materials may comprise degradable polymers. The degradability of a polymer depends at least in part on its backbone structure. For instance, the presence of hydrolyzable and/or oxidizable linkages in the backbone often yields a material that will degrade as described herein. The rates at which such polymers degrade are dependent on the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how it degrades, e.g., temperature, presence of moisture, oxygen, microorganisms, enzymes, pH, and the like. Generally, the degradable polymers used in the present invention should be formulated and have a molecular weight such that they are solid at room temperature and do not generally plasticize at room temperature by the addition of oil or an aqueous phase.

Suitable examples of degradable polymers that may be used in accordance with the present invention include, but are not limited to, homopolymers, random, block, graft, and star- and hyper-branched polymers. Examples of suitable degradable polymers that may be used in conjunction with the methods of this invention include, but are not limited to, polysaccharides (such as dextran or cellulose); chitin; chitosan; proteins; aliphatic polyesters; polylactic acids; poly(glycolides); poly($\epsilon$-caprolactones); poly(hydroxy ester ethers); poly(hydroxybutyrates); poly(anhydrides); polycarbonates; poly(orthoesters); poly(amino acids); poly(ethylene oxides); poly(phosphazenes); poly etheresters, polyester amides, polyamides, and copolymers or blends of any of these degradable materials. The term "copolymer," as used herein, is not limited to the combination of two polymers, but includes any combination of polymers, e.g., terpolymers, block copolymers, graft copolymers, star block copolymers, and the like. Of these suitable polymers, polylactic acids, and poly(lactide)-co-poly(glycolide) copolymers may be used, in some embodiments. As used herein, "poly(lactic acid)" refers to a polymer that may be synthesized from lactic acid, for example, by a condensation reaction or by the ring-opening polymerization of a cyclic lactide monomer, and is sometimes referred to as "PLA," "polylactate," or "polylactide."

Other degradable polymers that are subject to degradation also may be suitable. One's choice may depend on the particular application and the conditions involved. Other guidelines to consider include the degradation products that result, the time required for the requisite degree of degradation, the desired result of the degradation (e.g., voids), temperature, time, and additives that may be used.

Where degradable polymers are included in the degradable material, the degradable polymers may at least partially prevent flow back of the macro-particulates after introduction of the particulate composition into the subterranean formation. At temperatures above the glass transition temperature ("$T_g$"), the degradable polymers may have properties (e.g., tackiness) that may act to at least partially prevent the flow back. The degradable polymers may at least partially prevent flow back for a certain period of time, for example, until the degradable polymer is fully degraded. Poly(lactic acid), an example of a particular degradable polymer, generally has a $T_g$ in the range of from about 30° C. to about 60° C. The temperature may be reached by the heating of the degradable material to the bottom hole static temperature, for example, after introduction into the subterranean formation.

In certain embodiments, plasticizers may be included in the degradable material used in the methods of the present invention. Among other things, the incorporation of plasticizers into the degradable material should decrease the $T_g$ of the degradable material. The plasticizers may be present in an amount sufficient to provide the desired characteristics, for example, a desired tackiness to the generated degradable materials. Tackiness may be desirable, for example, to at least partially prevent flow back of the macro-particulates. Generally, the plasticizer, in some embodiments, should not plasticize the polymer at surface temperature before pumping of the particulate-laden fluids into a well bore, but should plasticize the polymer after the particulate composition has been placed into a subterranean formation and/or packed into a fracture. If premature plasticization occurs, the stress-reducing effect of the degradable particulates may be reduced. In addition to the other qualities above, the plasticizers may enhance the degradation rate of the degradable materials. The plasticizers, if used, are preferably at least intimately incorporated within the degradable materials. An example of a suitable plasticizer for polylactic acid would include oligomeric lactic acid. Examples of plasticizers useful for this invention include, but are not limited to, polyethylene glycol; polyethylene oxide; oligomeric lactic acid; citrate esters (such as tributyl citrate oligomers, triethyl citrate, acetyltributyl citrate, and acetyltriethyl citrate); glucose monoesters; partially fatty acid esters; PEG monolaurate; triacetin; poly(e-caprolactone); poly(hydroxybutyrate); glycerin-1-benzoate-2,3-dilaurate; glycerin-2-benzoate-1,3-dilaurate; bis(butyl diethylene glycol)adipate; ethylphthalyl-ethyl glycolate; glycerin diacetate monocaprylate; diacetyl monoacyl glycerol; polypropylene glycol (and epoxy derivatives thereof); poly(propylene glycol)dibenzoate, dipropylene glycol dibenzoate; glycerol; ethyl phthalyl ethyl glycolate; poly(ethylene adipate)distearate; di-iso-butyl adipate; and combinations thereof. The choice of an appropriate plasticizer will depend on the particular degradable material utilized. It should be noted that, in certain embodiments, when initially formed, the degradable material may be somewhat pliable. But once substantially all of the solvent has been removed, the particulates should harden. More pliable degradable materials may be beneficial in certain chosen applications. The addition of presence of a plasticizer can affect the relative degree of pliability. Also, the relative degree of crystallinity and amorphousness of the degradable material can affect the relative hardness of the degradable materials.

Dehydrated compounds also may be suitable degradable materials that may be included in the degradable particulates included in the particulate composition of the fluids of the present invention. Suitable dehydrated compounds include those materials that will degrade over time when rehydrated. For example, a particulate solid dehydrated salt or a particulate solid anhydrous borate material that degrades over time may be suitable. Specific examples of particulate solid anhydrous borate materials that may be used include but are not limited to anhydrous sodium tetraborate (also known as anhydrous borax), and anhydrous boric acid. These anhydrous borate materials are only slightly soluble in water. However, with time and heat in a subterranean environment, the anhydrous borate materials react with the surrounding aqueous fluid and are hydrated. The resulting hydrated borate materials are substantially soluble in water as compared to anhydrous borate materials and as a result degrade in the aqueous fluid.

Oil-soluble materials also may be a suitable degradable material. Suitable oil-soluble materials include natural or synthetic polymers, such as, for example, poly(butadiene), polyisoprene, polyether urethane, polyester urethane, and polyolefins (such as polyethylene, polypropylene, polyisobutylene, and polystyrene), and copolymers and blends thereof. Where oil-soluble materials are used, the particular oil-soluble material and liquid component should be selected so that the water-soluble material does not undesirable degrade prior to providing the desired friction reduction. For example, oil-soluble materials may be suitable for use in an aqueous carrier fluids and/or water-based drilling or drill-in fluids. Where oil-soluble materials are used, in some embodiments, the oil-soluble materials may be degraded, for example, by the fluids (e.g., oil) subsequently produced from the formation. If used in a drilling fluid, the oil-soluble materials present in the filtercake formed with the drilling fluid also may be dissolved by the subsequent production of oil.

Water-soluble materials also may be a suitable degradable material. Suitable water-soluble materials include, but are not limited to, calcium carbonate, fused magnesium oxide, calcium oxide. Where water-soluble materials are used, the particular water-soluble material and liquid component should be selected so that the water-soluble material does not undesirably degrade prior to providing the desired friction reduction. For example, water-soluble materials may be used in oil-based drilling fluids, oil-based fracturing, fluids, and oil-based gravel packing fluids. The water-soluble materials should then dissolve from contact with water present in the subterranean formation. Additionally, water-soluble materials also may be used in aqueous fluids, if a desirable level of friction reduction may occur prior to solubilization of the water-soluble material in the aqueous fluid.

Blends of certain degradable materials and other compounds may also be suitable. One example of a suitable blend of materials is a mixture of polylactic acid and sodium borate where the mixing of an acid and base could result in a neutral solution where this is desirable. Another example would include a blend of polylactic acid and boric oxide. In choosing the appropriate degradable material or materials, one should consider the degradation products that will result. The degradation products should not adversely affect subterranean operations or components.

The choice of degradable material to include in the degradable particulates also can depend, at least in part, on the conditions of the well, e.g., well bore temperature. For instance, lactides have been found, in certain embodiments, to be suitable for lower temperature wells, including those within the range of 60° F. to 150° F. Polylactic acid and dehydrated compounds may be suitable for higher temperature wells, for example those within the range of from 180° F. to 250° F or even higher. Those of ordinary skill in the art will recognize, that the degradation rate of the degradable materials is generally related to temperature so that higher temperature wells generally should result in less residence time of the degradable material downhole. Also, in some embodiments, a preferable result is achieved if the degradable particulate degrades slowly over time as opposed to instantaneously. In some embodiments, it may be desirable when the degradable particulate does not substantially degrade until after the degradable particulate has been substantially placed in a desired location within a subterranean formation.

The degradable particulates have a mean particle diameter of at least about 20 times smaller than the mean particle diameter of the macro-particulates. In some embodiments, the degradable particulates have a mean particle diameter of at least about 50 times smaller than the mean particle diameter of the macro-particulates. In some embodiments, the degradable particulates have a mean particle diameter of at least about 100 times smaller than the mean particle diameter of the macro-particulates. In some embodiments, the degradable particulates have a mean particle diameter of at least about 1,000 times smaller than the mean particle diameter of the macro-particulates. In some embodiments, the degradable particulates have a mean particle diameter of at least about 3,000 times smaller than the mean particle diameter of the macro-particulates. In some embodiments, the degradable particulates may have a mean particle diameter in the range of from about 10 nanometers to about 30 microns. The exact size of the degradable particulates used depends on the degradable particulate chosen, the density of the different particulate compositions, the size of the macro-particulates, and a number of other factors.

The degradable particulates should be present in the particulate composition in an amount sufficient to provide reduce friction between the macro-particulates. In some embodiments, the degradable particulates are present in the particulate composition in an amount in the range of from about 0.25% to about 20% by volume of the particulate composition. In some embodiments, the degradable particulates are present in the particulate composition in an amount in the range of from about 2% to about 10% by volume of the particulate composition. In some embodiments, the degradable particulates are present in the particulate composition in an amount in the range of from about 3% to about 5% by volume of the particulate composition. The amount the degradable particulates to use is based on a number of factors including, particle size and density of the different particulate compositions.

Optionally, the fluids of the present invention also may include one or more of a variety of additional additives such as breakers, stabilizers, fluid loss control additives, clay stabilizers, bactericides, corrosion inhibitors, surfactants, oxidizers, combinations thereof, and the like. For example, certain surfactants (e.g., sodium n-dodecyl sulfate, cetyltrimethylammonium bromide, betaines, etc.) may be used as friction reducers in combination with the degradable particulates. Those of ordinary skill in the art, with the benefit of this disclosure, will be able to select the appropriate additional additives to include in the fluids for a particular application.

The fluids of the present invention may be used in surface and subterranean applications where reduction in friction caused by particulate loading is desired. For example, the methods and compositions of the present invention may be particularly suitable for use in fracturing and/or gravel packing operations. An example of a method of the present invention comprises: providing a fluid comprising a liquid component and a particulate composition, wherein the particulate composition comprises macro-particulates and degradable particulates having a mean particle diameter of at least about 20 times smaller than the mean particle diameter of the macro-particulates; and introducing the fluid into a subterranean formation. The degradable particulates are generally present in the particulate composition in an amount sufficient to reduce friction between the macro-particulates. In certain embodiments, the liquid component may further comprise a viscosifying agent (e.g., xanthan, guar or guar derivatives, cellulose derivatives, a viscoelastic surfactant, etc.) that may aid in suspending the particulate composition in the fluid, thereby enhancing the uniformity of the suspension.

As discussed previously, the methods of the present invention may be particularly suitable for use in fracturing and/or gravel packing operations. In the fracturing embodiments, the method further comprises introducing the fluid into the subterranean formation at or above a pressure sufficient to create or enhance one or more fractures in the subterranean formation. In such fracturing and gravel packing operations, at least a portion of the particulate composition of the fluids of the present invention may be deposited within and/or neighboring the subterranean formation, e.g., a proppant pack or a gravel pack. For example, in the fracturing embodiments, the fluid may be introduced into the subterranean formation so that at least a portion of the particulate composition may form a proppant pack in the one or more factures. In the gravel packing embodiments, the fluid may be introduced in the subterranean formation so that at least a portion of the particulate composition may form a gravel pack in and/or neighboring the portion of the subterranean formation.

When used in such subterranean applications, the presence of the degradable particulates in the particulate composition of the fluids of the present invention may impart a lubricating effect upon the macro-particulates as the fluids of the present invention flow within the subterranean formation. This lubricating effect may reduce the viscosity and/or yield point of a proppant pack or gravel pack during, or after its placement in the formation by the fluids of the present invention. Further, this lubricating effect may permit a fluid of the present invention comprising a dispersion of degradable and macro-particulates to penetrate further into a subterranean formation during a treatment operation, thereby increasing the amount of solids that a fluid of the present invention successfully may deposit within the formation. As discussed above, certain degradable particulates (e.g., those comprising degradable polymers) may at least partially prevent flow back of the macro-particulates after introduction of the particulate composition into the subterranean formation. For example, at temperatures above $T_g$, the degradable polymers may have properties (e.g., tackiness) that may act to at least partially prevent the flow back.

Another example of a method of the present invention is a method of enhancing the flow of drill cuttings comprising: providing a drilling fluid; drilling at least a portion of a well bore using at least the drilling fluid, wherein the drilling produces drill cuttings in the drilling fluid; and adding degradable particulates to the drilling fluid in an amount sufficient to reduce friction between the drilling cutting, wherein the degradable particulates have a mean particle diameter of at least about 20 times smaller than the mean particle diameter of the macro-particulates. Among other things, the degradable particulates may facilitate the flow back of the drill cutting and also prevent or reduce problems encountered during drilling operations (e.g., stuck pipe).

To facilitate a better understanding of the present invention, the following example(s) of certain aspects of some embodiments are given. In no way should the following example(s) be read to limit, or define, the scope of the invention.

EXAMPLE 1

A sample composition was prepared by dispersing 20/40 Brady sand (density=2.65 g/cc) by hand, using a spatula, into a 1% solution of carboxymethyl hydroxylpropylguar until the dispersion was visibly uniform. To this sample composition, degradable polylactic acid particulates having a mean particle diameter of 3 microns were dispersed by hand, using a spatula. Accordingly, the sample composition comprised 55% total solids volume that comprised 5% by volume of 3 micron degradable polylactic acid particulates, and 95% by volume of macro-particulates of Brady sand.

The sample composition was then observed. The apparent viscosity of the sample composition was observed to have substantially reduced with addition of the degradable particulates. A reduction in friction between the particulates of Brady sand was also observed, due to the improved flowability and pourability of the sample composition after the addition of the degradable particulates.

EXAMPLE 2

20/40 Brady sand (density=2.65 g/cc) having a mean particle diameter of 490 microns, and found to have no detectable fines having particle diameters below 130 microns, was mixed with varying proportions of polylactic acid micro-particulates (density=1.25 g/cc) having average particle diameter of 14 microns. The sand particles and polylactic acid micro particles were dispersed by hand, using a spatula, into a 0.5% solution in water of carboxymethyl hydroxypropylguar until the dispersion was visibly uniform. These sample compositions were then tested with a Fann Yield Stress Adapter, described in U.S. Pat. No. 6,874,353, to determine their residual stress and viscosity in a fluid at different solid loadings. The testing was done as described in U.S. Pat. No. 6,874,353.

Sample Composition Nos. 1 to 3 comprised aqueous dispersions of 45%, 52.5% and 57% total solids volume, respectively in a 0.5% carboxymethyl hydroxypropylguar solution in water. The total solid volume entirely comprised 20/40 Brady sand. The apparent viscosities of Sample Compositions 1 through 3 were measured to be 13.9, 33.8 and 58.1 Pa-second, respectively. The residual stress of Sample Compositions 1 through 3 was measured to be 0, 9 and 27 Pa, respectively.

Sample Composition Nos. 4 to 6 comprised aqueous dispersions of 45%, 52.5% and 57% total solids volume, respectively in a 0.5% carboxymethyl hydroxypropylguar solution in water. The total solid volume comprised 3% of the 14-micron micro-particulates of polylactic acid by volume, and 97% of macro-particulates of 20/40 Brady sand by volume. The apparent viscosities of Sample Compositions 4 through 6 were measured to be 8.6, 17 and 24.4 Pa-second, respectively. The residual stress of Sample Compositions 4 through 6 was measured to be 0, 1.25 and 4 Pa, respectively.

Sample Composition Nos. 7 to 9 comprised aqueous dispersions of 45%, 52.5% and 57% total solids volume, respectively in a 0.5% carboxymethyl hydroxypropylguar solution in water. The total solid volume comprised 5% of 14-micron micro-particulates of polylactic acid by volume, and 95% of macro-particulates of 20/40 Brady sand volume. The apparent viscosities of Sample Compositions 7 through 9 were measured to be 6.3, 13.8 and 14.2 Pa-second, respectively. The residual stress of Sample Compositions 7 through 9 was measured to be 0, 1 and 1 Pa, respectively.

The results of this testing are set forth in tabular form below.

TABLE 1

|  | Viscosity of the Dispersion (Pa-second) | | |
| --- | --- | --- | --- |
|  | 45% total solids volume | 52.5% total solids volume | 57% total solids volume |
| Dispersions of macro-particulates of 20/40 Brady sand | 13.9 | 33.8 | 58.1 |
| Dispersions comprising 97% of 20/40 Brady sand and 3% of 14 micron polylactic acid micro-particulates | 8.6 | 17.0 | 24.4 |
| Dispersions comprising 95% of 20/40 Brady sand and 5% of 14 micron polylactic acid micro-particulates | 6.3 | 13.8 | 14.2 |

TABLE 2

|  | Residual Stress of the Dispersion (Pa) | | |
| --- | --- | --- | --- |
|  | 45% total solids volume | 52.5% total solids volume | 57% total solids volume |
| Dispersions of macro-particulates of 20/40 Brady sand | 0 | 9 | 27 |
| Dispersions comprising 97% of 20/40 Brady sand and 3% of 14 micron polylactic acid micro-particulates | 0 | 1.25 | 4 |
| Dispersions comprising 95% of 20/40 Brady sand and 5% of 14 micron polylactic acid micro-particulates | 0 | 1 | 1 |

The above example demonstrates, inter alia, that the fluids comprising macro-particulates and degradable micro-particulates demonstrate apparent reduction of viscosity and residual stress of the particle laden fluid.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A method of enhancing the flow of particulates comprising:
    providing macro-particulates;
    providing degradable particulates having a mean particulate diameter of at least about 20 times smaller than the man particle diameter of the macro-particulates;
    preparing a fluid comprising a liquid component and a particulate composition, wherein the particulate composition comprising the macro-particulates and the degradable particulates in an amount sufficient to reduce friction between the macro-particulates; and
    flowing the fluid from a first location to a second location.

2. The method of claim 1 wherein the degradable particulates are present in the particulate composition in an amount in the range of from about 0.25% to about 20% by volume of the particulate composition.

3. The method of claim 1 wherein the degradable particulates comprise at least one degradable material selected from the group consisting of a degradable polymer, a dehydrated compound, an oil-soluble material, a water-soluble compound, and mixtures thereof.

4. The method of claim 1 wherein the degradable particulates have a mean particle diameter in the range of from about 10 nanometers to about 30 microns.

5. The method of claim 1 wherein the particulate composition is present in the fluid in an amount in the range of from about 50% to about 68% by volume of the fluid.

6. A method of treating a subterranean formation comprising:
    providing a fluid comprising a liquid component and a particulate composition, wherein the particulate composition comprises macro-particulates and degradable particulates having a mean particle diameter of at least about 20 times smaller than the mean particle diameter of the macro-particulates, wherein the degradable particulates are present in the particulate composition in an amount sufficient to reduce friction between the macro-particulates; and
    introducing the fluid into a subterranean formation.

7. The method of claim 6 wherein the liquid component is selected from the group consisting of water, brine, a viscosified fluid, a foam, an aqueous gel, a viscoelastic surfactant gel, an emulsion; and combinations thereof.

8. The method of claim 6 wherein the macro-particulates are selected from the group consisting of sand, bauxite, a ceramic material, a glass material, a polymer material, a thermoplastic fluoropolymer, a nut shell piece, a seed shell piece, a cured resinous particulate comprising nut shell pieces, a cured resinous particulate comprising seed shell pieces, a fruit pit piece, a cured resinous particulate comprising fruit pit pieces, wood, a composite particulate, and combinations thereof.

9. The method of claim 8 wherein the degradable particulates comprise at least one degradable material selected from the group consisting of a degradable polymer, a dehydrated compound, an oil-soluble material, a water-soluble compound, and mixtures thereof.

10. The method of claim 6 wherein the degradable particulates are present in the particulate composition in an amount in the range of from about 0.25% to about 20% by volume of the particulate composition.

11. The method of claim 6 wherein the macro-particulates have a mean particle diameter in the range of from about 6 mesh to about 400 mesh.

12. The method of claim 6 wherein the degradable particulates comprise at least one degradable polymer selected from the group consisting of a polysaccharides, a chitin, a chitosan, a protein, an aliphatic polyesters, a poly(lactic acid), a poly(glycolide), a poly($\epsilon$-caprolactone), a poly(hydroxy ester ether), a poly(hydroxybutyrate), a poly(anhydride), a polycarbonate, a poly(orthoester), a poly(amino acid), a poly(ethylene oxide), a poly(phosphazene), a poly etherester, a polyester amide, a polyamide, and copolymers and blends thereof.

13. The method of claim 6 wherein the degradable particulates comprise at poly(lactic acid).

14. The method of claim 6 wherein the degradable particulates comprise at least one oil-soluble material selected from the group consisting of poly(butadiene), polyisoprene, polyether urethane, polyester urethane, polyolefins (such as polyethylene, polypropylene, polyisobutylene, and polystyrene), and copolymers and blends thereof.

15. The method of claim 6 wherein the degradable particulates comprise at least one water-soluble material selected from the group consisting of calcium carbonate, fused magnesium oxide, calcium oxide, and combinations thereof.

16. The method of claim 6 wherein the degradable particulates have a mean particle diameter of at least about 100 times smaller than the mean particle diameter of the macro-particulates.

17. The method of claim 6 wherein the degradable particulates have a mean particle diameter of at least about 1,000 times smaller than the mean particle diameter of the macro-particulates.

18. The method of claim 6 wherein the degradable particulates have a mean particle diameter in the range of from about 10 nanometers to about 30 microns.

19. The method of claim 6 wherein the particulate composition is present in the fluid in an amount in the range of from about 50% to about 68% by volume of the fluid.

20. The method of claim 6 wherein the fluid is introduced into the subterranean formation at a pressure sufficient to create and least one fracture in the subterranean formation.

21. The method of claim 6 wherein at least a portion of the particulate composition is deposited in and/or neighboring the subterranean formation.

22. The method of claim 21 wherein the degradable particulates at least partially prevent flow back of the particulate composition deposited in and/or neighboring the subterranean formation.

23. A method of fracturing a subterranean formation comprising:
   introducing a fluid into subterranean formation at or above a rate sufficient to create or enhance one or more fractures in the subterranean formation; and
   depositing a particulate composition into the one or more fractures so that the particulate composition props the one or more fractures, thereby preventing the one or more fractures from fully closing, wherein the particulate composition comprises macro-particulates and degradable particulates having a mean particle diameter of at least about 20 times smaller than the mean particle diameter of the macro-particulates, wherein the degradable particulates are present in the particulate composition in an amount sufficient to reduce friction between the macro-particulates.

24. The method of claim 23 wherein the particulate composition is present in the fluid in an amount in the range of from about 50% to about 68% by volume of the fluid.

25. The method of claim 23 wherein the degradable particulates are present in the particulate composition in an amount in the range of from about 0.25% to about 20% by volume of the particulate composition.

26. The method of claim 23 wherein the degradable particulates comprise at least one degradable material selected from the group consisting of a degradable polymer, a dehydrated compound, an oil-soluble material, a water-soluble compound, and mixtures thereof.

* * * * *